Patented Feb. 18, 1941

2,232,168

UNITED STATES PATENT OFFICE 2,232,168

TITANIUM PIGMENT AND METHOD OF PRODUCING THE SAME

David H. Dawson, Linthicum Heights, Md., assignor to E. I. du Pont de Nemours & Company, Wilmington, Del., a corporation of Delaware No Drawing. Application May 19, 1939,
Serial No. 274,495

13 Claims. (Cl. 134—58)

This invention relates to a process for the production of improved titanium pigments. More particularly it relates to the production of improved titanium pigments useful in coating compositions. Still more particularly it relates to an improved titanium oxide pigment useful as a delustrant for artificial fibers.

It is well known in the art that coating compositions having incorporated therein titanium pigments have a tendency to fade, chalk, and lose their gloss when applied as films. This is especially true of oleaginous coating compositions such as enamels and lacquers. Although various treatments have been proposed for eliminating the aforementioned deficiencies they still persist to an undesirable extent.

It is also well known in the art that artificial fibers, such as cellulose acetate, are ordinarily glossy and provide fabrics having a lustrous appearance. For many uses it is essential that such fibers should be delustered and the best known delustrant is titanium dioxide. The delustered material comprising titanium dioxide has a fine appearance but when dyed is far more fugitive to light than is the corresponding undelustered material. Furthermore, the titanium oxide pigments heretofore available for this purpose had a very marked and serious deleterious effect on the fiber strength and elasticity, that is, the titanium oxide pigment tenders the fiber to an undesirable extent upon exposure to light. A substantial advance in the art was made when it was discovered, as disclosed in U. S. Patent #2,132,491, that substantial amounts of chromium compounds added to the spinning mass or associated with the titanium dioxide improved the light resistance of one type of delustered artificial fibers, namely those of regenerated cellulose, such as viscose rayon. However, said chromium treated titanium dioxide had an objectionable yellow or green color and hence were unsuitable for use as a delustrant in many types of artificial fiber fabrics, particularly of cellulose acetate.

This invention has as an object the production of an improved titanium pigment. A further object is the production of an improved titanium pigment which has improved resistance to fading, chalking, and loss of gloss retention when incorporated in coating compositions and exposed as films. A still further object is the production of improved titanium pigments useful as delustrants for artificial fibers. A still further object is the production of a titanium pigment of good color which when employed as a delustrant in artificial fibers, such as regenerated cellulose, cellulose acetate, and the like, provides fibers which on dyeing have good light resistance. A still further object is the production of titanium pigments which when employed as delustrants in artificial fibers have little tendering effect on said fibers. Additional objects will become apparent from an examination of the following description and claims.

These and other objects and advantages are attained according to the herein described invention which broadly comprises treating a calcined titanium pigment with co-precipitated or admixed hydrated oxides or basic salts of aluminum and chromium, adjusting the pH to between about 5 and about 9 by the addition of a neutralizing agent, and thereafter mixing to obtain intimate association of said hydrated oxides with the pigment. Subsequently, the slurry is dewatered and the pigment dried.

In a more restricted sense this invention comprises adding to a suspension of a calcined wet-milled titanium pigment between about 0.5% and about 1.5%, calculated as $Al_2O_3$ and based upon the weight of the pigment, of hydrated aluminum oxide and between about 0.05% and about 0.15%, calculated as $Cr_2O_3$ and based upon the weight of the pigment, of hydrated chromic oxide. The pH of the suspension is then adjusted to between about 6 and about 8 by the addition of a neutralizing agent. The resulting mixture is then heated and maintained at a temperature between about 60° C. and about 90° C. while stirring, thereby effecting intimate association of the aforementioned hydrated oxides with the pigment. Subsequently, the slurry is dewatered, the pigment dried at a temperature not in excess of 250° C. and the pigment dry-milled.

The preferred embodiment of this invention comprises adding to an agitated suspension of calcined wet-milled titanium dioxide between about 0.8% and about 1.2%, calculated as $Al_2O_3$ and based upon the weight of the pigment, of a solution of barium aluminate, and between about 0.08% and about 0.12%, calculated as $Cr_2O_3$ and based upon the weight of the pigment, of chromic sulfate. The pH of the suspension is then adjusted to between about 6.8 and about 7.4 by addition thereto of a solution of alum. The suspension is then maintained at a temperature between about 70° C. and about 85° C. for at least one hour, the suspension being subjected to vigorous agitation during said heating. After heating has been discontinued the suspension is then subjected to vigorous agitation for at least one hour. Thereafter, the pigment suspension is dewatered, the pigment dried at a temperature between about 100° C. and about 200° C., and the pigment dry-milled.

This invention may be more readily understood from an examination of the following examples which are given for illustrative purposes and are not intended to place any restrictions or limitations on the herein described invention.

Example I

A sample of an aqueous slurry of calcined wet-milled pigment titanium dioxide comprising 20% $TiO_2$ by weight was heated to a temperature of 75° C. and treated by addition thereto, with stirring, of aluminum sulfate and chromic sulfate in amounts equivalent to 1% $Al_2O_3$ and 0.1% $Cr_2O_3$ on the basis of the $TiO_2$ weight. The mixture was maintained at a temperature in the range of from 80° C. to 90° C. and stirred continuously for a period of two hours. Heating was then stopped and ammonium hydroxide was added with stirring until a slurry pH of 7.5 was attained, thereby co-precipitating the aluminum and chromic sulfates as hydrated oxides on the surface of the pigment titanium dioxide particles. The suspension was agitated for another hour, was then filtered, and the treated pigment was dried at a temperature of 160° C. and disintegrated by passage through a rotary hammer mill. The novel pigment product thereby obtained was designated as sample A.

A second sample of the aqueous slurry of calcined wet-milled pigment titanium dioxide was treated in the same manner as that employed in producing pigment sample A except that addition of the aluminum sulfate was omitted. The pigment product thereby obtained was designated as sample B.

A third sample of the aqueous slurry of calcined wet-milled pigment titanium dioxide was treated in the same manner as that employed in producing pigment sample B except that the chromic sulfate was added in an amount corresponding to 0.7% $Cr_2O_3$ on the basis of the pigment weight. The pigment product obtained was designated as sample C.

A fourth sample of the aqueous slurry of calcined wet-milled pigment titanium dioxide was treated in the same manner as that employed in producing pigment sample A except that addition of the chromic sulfate was omitted. The pigment product thus produced was designated as sample D.

A fifth sample of the aqueous slurry of calcined wet-milled pigment titanium dioxide was treated in the same manner as that employed in producing pigment sample D except that the aluminum sulfate was added in an amount equivalent to 5% $Al_2O_3$ on the basis of the pigment weight. The pigment product obtained was designated as sample E.

A sixth sample of the aqueous slurry of calcined wet-milled pigment titanium dioxide was finished off as untreated pigment by merely filtering the suspension, drying the pigment at a temperature of 160° C., and disintegrating the same by passage through a rotary hammer mill.

Samples of delustered cellulose acetate yarn comprising 1.6% pigment were prepared under identical conditions by well known means employing as delustrants the aforementioned pigment samples. The six samples of the delustered yarn produced were dyed with a blue cellulose acetate dye under identical conditions and after exposure to sunlight under identical conditions were tested for percent fading (per cent increase in reflectance at 610 millimicrons), percent loss in tensile strength (percent tensile strength was lower than that of comparable undelustered yarn), and percent elongation. The brightness of the pigment samples was also determined.

The data thus obtained are recorded in the following table:

| Pigment sample | Pigment brightness | Delustered thread exposed to sunlight | | |
|---|---|---|---|---|
| | | Percent fading | Percent loss in tensile strength | Percent elongation |
| Untreated TiO2 | 97.0 | 44.0 | 28.0 | 14 |
| A | 95.4 | 12.5 | 7.1 | 25 |
| B | 95.4 | 40.0 | 25.0 | 15 |
| C | 89.1 | 15.2 | 9.2 | 22 |
| D | 96.0 | 41.0 | 28.0 | 14 |
| E | 96.0 | 35.0 | 29.0 | 13 |

It will be noted that while the untreated titanium dioxide had excellent brightness, the yarn delustered therewith faded badly, was definitely low in tensile strength, and its elasticity, as measured by percent elongation, was low. On the other hand, the novel pigment product of this invention, namely sample A, had good color and provided delustered yarn which faded only slightly and had good tensile strength and elasticity characteristics. It will be noted that hydrated chromic oxide alone, even when precipitated on the titanium dioxide pigment in an amount corresponding to as much as 0.7% $Cr_2O_3$, when employed as a delustrant, produced yarn inferior in fading, tensile strength, and elongation characteristics to those had with the novel pigment of this invention. Furthermore, sample C, comprising 0.7% $Cr_2O_3$, was of such low brightness and poor color that it was unfit for use as a white pigmenting and delustering material. On the other hand, samples D and E, treated with hydrated aluminum oxide alone, were not significantly better than the untreated $TiO_2$ as cellulose acetate yarn delustrants.

Example II

A sample of a slurry of wet-milled calcined pigment titanium dioxide comprising 20% titanium dioxide was heated to a temperature of 85° C. and there was added thereto, with stirring, a solution of chromic chloride in an amount equivalent to 0.1% $Cr_2O_3$ on the basis of the titanium dioxide weight. A sodium hydroxide solution was added in an amount sufficient to raise the pH of the slurry to 7.5. Stirring was continued for two hours and the slurry was maintained at a temperature of between 80° C. and 90° C. Heating was then discontinued and there was added to the slurry, with stirring, an aqueous suspension of freshly precipitated well-washed aluminum hydroxide in an amount equivalent to 1% $Al_2O_3$ on the basis of the pigment weight. Stirring was continued for another two hours after which the treated pigment slurry was filtered, the pigment dried at a temperature 160° C., and disintegrated by passage through a rotary hammer mill. The pigment possessed a brightness in excess of 95% and when employed as a delustrant in dyed cellulose acetate yarns provided yarns having excellent fade resistance, tensile strength, and elasticity.

Example III

The procedure of Example II was followed with another sample of a 20% slurry of calcined wet-milled pigment titanium dioxide except that the chromic chloride was added in an amount corresponding to 0.05% $Cr_2O_3$ on the basis of the pigment weight. The resultant pigment was slightly superior in brightness to that obtained in Example II and had only slightly inferior properties as a cellulose acetate yarn delustrant.

Example IV

An aqueous slurry of wet-milled calcined pigment titanium dioxide comprising 20% by weight titanium dioxide was heated to a temperature of 85° C. and there was added thereto, with stirring, a solution of chromic chloride in an amount equivalent to 0.1% $Cr_2O_3$ on the basis of the pigment weight. Ammonium hydroxide was added in an amount sufficient to raise the pH of the slurry to 7.5 and agitation was continued for two hours. Thereafter, a solution of aluminum sulfate was added in an amount equivalent to 2% $Al_2O_3$ on the basis of the pigment weight. Ammonium hydroxide was again added until a pH of 7.5 was again attained and agitation was continued for a period of another two hours, whereupon the suspension was filtered, the pigment dried at a temperature of 160 C., and dry-milled by passage through a rotary hammer mill. The novel pigment titanium dioxide thus produced when employed as a delustrant in dyed cellulose acetate yarn provided yarn having excellent fade resistance, tensile strength, and elasticity.

Example V

An aqueous slurry of wet-milled calcined pigment titanium dioxide comprising 20% by weight titanium dioxide was heated to a temperature of 85° C. and there was added thereto, with stirring, a solution of chromic sulfate in an amount equivalent to 0.08% $Cr_2O_3$ on the basis of the pigment weight. Barium hydroxide was added in an amount sufficient to raise the pH of the slurry to 7.5 and agitation was continued for two hours. Thereafter, a solution of aluminum sulfate was added in an amount equivalent to 1.5% $Al_2O_3$ on the basis of the pigment weight. Barium hydroxide was again added until a pH of 7.5 was again attained and agitation was continued for a period of another two hours, whereupon the suspension was filtered, the pigment dried at a temperature of 160° C. and dry-milled by a passage through a rotary hammer mill. The novel pigment titanium dioxide thus produced when employed as a delustrant in dyed cellulose acetate yarn provided yarn having excellent fade resistance, tensile strength, and elasticity.

Example VI

An aqueous slurry of wet-milled calcined pigment titanium dioxide comprising 20% by weight titanium dioxide was heated to a temperature of 85° C. and there was added thereto, with stirring, a solution of barium aluminate in an amount equivalent to 1% $Al_2O_3$ on the basis of the pigment weight. The suspension was stirred for a period of two hours after which a solution of chromic sulfate in an amount equivalent to 0.1% $Cr_2O_3$ on the basis of the pigment weight was added with stirring. The suspension was stirred for a further two hours after which sulfuric acid was added in an amount sufficient to lower the pH to 7. The resultant pigment suspension comprising calcined titanium dioxide coated with 2.3% barium sulfate and hydrated oxides of aluminum and chromium in amounts equivalent to 1% $Al_2O_3$ and 0.1% $Cr_2O_3$ respectively, on the basis of the pigment weight, was filtered, the treated pigment dried at a temperature of 160° C. and dry-milled by passage through a rotary hammer mill. The novel pigment titanium oxide produced when employed as a delustrant in dyed cellulose acetate yarn provided delustered yarn having excellent fade resistance, tensile strength, and elasticity. Further, when the resulting pigment was incorporated in coating compositions there was a decided improvement in fading, chalking, and loss of gloss retention.

Example VII

The procedure of Example VI was followed with another sample of a 20% slurry of calcined wet-milled pigment titanium dioxide, except that the barium aluminate was added in an amount equivalent to 1.5% $Al_2O_3$ on the basis of the pigment weight. The pigment thus had when employed as a delustrant in dyed cellulose acetate yarn provided yarn having excellent fade resistance, tensile strength, and elasticity, said delustered yarn being only slightly inferior in these properties to that obtained when the pigment of Example VI was employed.

Example VIII

The procedure of Example VI was followed with still another sample of a 20% slurry of calcined wet-milled pigment titanium dioxide except that the chromic sulfate was added in an amount equivalent to 0.2% $Cr_2O_3$ on the basis of the pigment weight. The pigment obtained in this instance was slightly poorer in color than that of Example VI but when employed as a delustrant in dyed celulose acetate yarn it provided yarn having excellent fade resistance, tensile strength, and elasticity.

Example IX

An aqueous slurry of wet-milled calcined pigment titanium dioxide comprising 20% by weight titanium dioxide was heated to a temperature of 85° C. and there was added thereto, with stirring, a solution of sodium aluminate ($NaAlO_2$) in an amount equivalent to 0.23% $Al_2O_3$ on the basis of the pigment weight. The suspension was stirred for a period of two hours after which there was added thereto, with stirring, a solution of chromic sulfate in an amount equivalent to the added sodium aluminate, i. e., in an amount equivalent to 0.114% $Cr_2O_3$ on the basis of the pigment weight, thereby co-precipitating hydrated oxides of chromium and aluminum on the surface of the titanium dioxide pigment particles. Agitation was continued for another hour after which a suspension of freshly precipitated well-washed aluminum hydroxide was added to the pigment suspension in an amount equivalent to 1.27% $Al_2O_3$ on the basis of the pigment weight thereby providing pigment titanium dioxide comprising hydrated oxides of aluminum and chromium in amounts equivalent to 1.5% $Al_2O_3$ and 0.114% $Cr_2O_3$, respectively, on the basis of the pigment weight. The resultant pigment slurry was filtered, the pigment dried at a temperature of 160° C. and dry-milled by passage through a rotary hammer mill. The novel pigment titanium dioxide produced when employed as a delustrant in dyed cellulose acetate yarn provided yarn having excellent fade resistance, tensile strength, and elasticity.

It is to be understood that the hereinbefore described specific embodiments of my invention may be subjected to variation and modification without departing from the scope thereof. For instance, while the invention has been described with particular application to the treatment of pigment titanium dioxide the treatment of other types of titanium pigments is included herein. Accordingly, the term "titanium pigment" as employed herein and in the appended claims includes not only titanium dioxide but also white titanium oxide pigments such as titanates of divalent metals and extended titanium oxide pigments, such as titanium dioxide extended with such materials as anhydrite, gypsum, barium sulfate, calcium carbonate, calcium sulfite, barium carbonate, silica, aluminum silicates, magnesium fluoride, sodium fluoride, aluminum fluoride, sodium fluosilicate, sodium aluminum fluoride, magnesium fluosilicate, pachnolite, calcium fluoride, and the like. It is further to be understood that the titanium oxygen compounds employed in my invention shall have had their pigment properties developed by calcination or other treatment, as by the process of U. S. Patent 1,892,693, and, preferably, shall have been wet-milled, as by the process of U. S. Patent 1,937,037, prior to treatment with hydrated aluminum and chromic oxides.

Furthermore, while the novel pigment of this invention has been described with particular emphasis on its use as a delustrant for artificial fibers, it is to be understood that it may be employed advantageously in coating compositions, or other instances wherein a titanium pigment is used.

As hereinbefore stated, I prefer to effect coating of the individual pigment particles by adding to an aqueous suspension thereof a solution of a soluble aluminate and a solution of a soluble chromic salt, and thereafter adjusting the pH of the aqueous slurry to between about 5 and about 9, and preferably between about 6.8 and about 7.4 by adding an acidic substance thereto. When an aluminate is used the pH is usually adjusted by employing an acidic substance, otherwise an alkaline compound is employed for adjusting the pH. Aluminates suitable for use in my invention include those of sodium, potassium, rubidium, cesium, and barium, while suitable chromic salts are chromium ammonium sulfate, [Cr(NH$_4$)(SO$_4$)$_2$.12H$_2$O], chromic bromide (CrBr$_3$.6H$_2$O), chromic chloride (CrCl$_3$.6H$_2$O)

chromic fluoride (CrF$_3$.9H$_2$O), chromic nitrate [Cr(NO$_3$)$_3$.9H$_2$O], chromium potassium sulfate [CrK(SO$_4$)$_2$.12H$_2$O], chromium rubidium sulfate [Cr$_2$(SO$_4$)$_3$.Rb$_2$SO$_4$.24H$_2$O], and chromic sulfate [Cr$_2$(SO$_4$)$_3$.18H$_2$O], and the like. Suitable acidic substances are mineral and organic acids and acid salts having an acidic reaction. Examples of suitable acidic substances include sulfuric acid, hydrochloric acid, nitric acid, acetic acid, and such acidic salts as aluminum chloride, aluminum sulfate, and the like.

However, it is to be understood that other methods may be employed to effect uniform distribution of the hydrated oxides on the surface of the pigment particles. For instance, there may be added to the aqueous suspension of the pigment a soluble chromic salt and a soluble aluminum salt such as aluminum sulfate, aluminum nitrate, aluminum chloride, or the like, preferably aluminum sulfate, and the hydrated oxides may then be co-precipitated on the surface of the individual pigment particles by adding an alkaline compound to the suspension in an amount sufficient to raise the pH of the suspension to between about 5 and about 9, and preferably between about 6.8 and about 7.4. Alkaline compounds contemplated for use in the invention include alkali and alkaline earth metal compounds, including ammonium compounds, which react with aqueous solutions of aluminum and chromic sulfates to form hydrated oxides. Examples of such compounds include the oxides, hydroxides, and carbonates of ammonium, sodium, potassium, calcium, strontium, barium, and the like.

Again, I may prepare the aluminum hydroxide separately and add an aqueous suspension thereof to the aqueous pigment suspension, thereafter adding to the resultant mixed suspension a soluble chromic salt with stirring and an alkaline compound in an amount sufficient to raise the pH of the suspension to between about 5 and about 9 and preferably between about 6.8 and about 7.4. In still another embodiment of my invention I may prepare a co-precipitate of hydrated aluminum oxide and hydrated chromic oxide in a separate vessel and thereafter add an aqueous suspension of said co-precipitated hydrated oxides to a suspension of the pigment. Moreover, I may prepare the hydrated oxide of aluminum and the hydrated oxide of chromium separately and add separate suspensions of said hydrated oxides to the aqueous pigment suspension. In instances where the hydrated oxides are prepared separately or co-precipitated separately and then added to the titanium pigment suspension, precipitation of the hydrated oxides is usually effected by addition of an alkaline compound to a solution of an aluminum salt, such as aluminum sulfate, or a solution of a chromic salt, such as chromic sulfate, or admixtures thereof, during agitation. Precipitant addition is preferably continued until the pH of the mixture is adjusted to substantial neutrality. After precipitation of the hydrated oxides, or admixtures thereof, said hydrated oxides are then washed free of soluble salts by any desirable means, such as by decantation, filtration, etc., complete drying of the precipitate being preferably avoided during such after treatment. An aqueous slurry or suspension of the purified product is then prepared and blended with a slurry or suspension of the titanium pigment.

After the aqueous suspension of titanium pigment has been treated with the hydrated oxides of chromium and aluminum, the mixture is thoroughly agitated, in order to insure uniform incorporation of the agent throughout the pigment, after which the treated pigment is dewatered, as by filtering, is dried, and dry-milled in order to break up lumps formed on drying, as by passage through a rotary hammer mill.

It is preferred that precipitation of the hydrated oxides should be effected at a temperature in the range of from about 60° C. to about 90° C., and for optimum results at a temperature in the range of from about 70° C. to about 85° C. Furthermore, for optimum results I prefer to maintain said slurry at a temperature in the aforementioned ranges for a period of about one hour after precipitation of said hydrated oxides in the presence of the pigment slurry or after addition of said oxides thereto. Moreover, it is preferred that the pigment slurry should be subjected to vigorous agitation both during precipitation of the hydrated oxides therein, and for a period of an hour after said precipitation or after addition of the separately prepared hydrated oxides thereto. While the heating period and agitating period is preferably one hour each it is to be understood that my invention is not limited thereto since a heating period and agitating period of as high as 24 hours or more may be employed.

While specific amounts of hydrated aluminum oxide and hydrated chromic oxide have been indicated as utilizable in the foregoing examples, it will be obvious that suitable variance therefrom may be had without departing from the invention and that the extent of pigment treatment afforded in each instance will vary with the type and previous history of the calcined titanium pigment and the properties required in the finished product. Thus, appreciable effects are obtained by additions of as little as about 0.25% of hydrated aluminum oxide, calculated as $Al_2O_3$ on the basis of the pigment weight, and of as little as about 0.01% hydrated chromic oxide, calculated as $Cr_2O_3$ on the basis of the pigment weight. Furthermore, appreciable effects are obtained when said oxides are added in amounts equivalent to as high as about 2% $Al_2O_3$ and 0.2% $Cr_2O_3$ respectively. Improved benefits are obtained when said hydrated oxides are employed in amounts equivalent to from about 0.5% to about 1.5% $Al_2O_3$ and from about 0.05% to about 0.15% $Cr_2O_3$. For optimum effects I prefer to add the hydrated aluminum oxide in an amount equivalent to from about 0.8% to about 1.2% $Al_2O_3$ and the hydrated chromic oxide in an amount equivalent to from about 0.08% to about 0.12% $Cr_2O_3$ on the basis of the pigment weight.

Preferably, the ratio of hydrated aluminum oxide, calculated as $Al_2O_3$, and of hydrated chromic oxide, calculated as $Cr_2O_3$, employed in my novel process should be in the range of from about 3:1 to about 30:1 and for optimum effects should be in the range of from about 7:1 to about 15:1.

Drying of the titanium pigment coated with the aforementioned hydrated oxides is an essential step in my novel process. It is essential that the pigment should not be calcined after being coated with said hydrated oxides. I have found it desirable to dry the pigment at a temperature not in excess of about 250° C. and preferably not in excess of about 200° C. Temperatures of less than about 100° C. should be avoided unless the pigment is dried at sub-atmospheric pressures.

When the novel pigment of my invention is used as a delustrant for artificial fibers the amount of pigment employed is between about 0.5% and about 3%, preferably between about 1% and about 2%, on the basis of the fiber weight.

The term "artificial fibers" as used herein and in the appended claims includes nylon, cellulose acetate fibers, regenerated cellulose such as viscose, cupra ammonium cellulose, cellulose regenerated from organic solvent soluble esters such as the nitrates, etc.

My process possesses advantages not previously combined in a single process. Furthermore, the product of my process possesses advantages not previously combined in a titanium pigment material. As illustrated in Example I, treatment of a titanium pigment with hydrated aluminum oxide alone has little, if any, beneficial effect on its properties as an artificial fiber delustrant. Furthermore, treatment with hydrated chromic oxide alone, even when said oxide is added in an amount equivalent to about 0.7% $Cr_2O_3$ or more, has little beneficial effect. Moreover, addition of hydrated chromic oxide in such large amounts provides a pigment unsuitable for industrial use because of its extremely poor color and brightness. However, my novel process in which I employ a mixture of relatively small amounts of the aforementioned hydrated oxides provides the unexpected result that a titanium pigment of good color is obtained and when employed as a delustrant produces thread, yarn, and the like, of excellent fade resistance, tensile strength, and elasticity. Furthermore, the novel titanium pigment of this invention when employed in oleaginous coating compositions, especially enamels and lacquers, provides film of excellent gloss and color which on exposure to the elements have definitely better fade resistance and gloss retention than comparable films comprising prior art titanium pigments.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing an improved pigment which comprises preparing a suspension, having a pH between about 5 and about 9, said suspension containing a titanium pigment and hydrated oxides of aluminum and chromium, and thereafter separating the resulting pigment and drying.

2. A process for producing an improved pigment which comprises adding to a suspension of a titanium pigment between about 0.25% and about 2%, calculated as $Al_2O_3$ and based on the weight of the pigment, of a soluble aluminum salt and between about 0.01% and about 0.2%, calculated as $Cr_2O_3$ and based on the weight of the pigment, of a soluble chromic salt, adjusting the pH of the suspension to between about 5 and about 9 by adding a neutralizing agent, mixing to obtain intimate association of the titanium pigment and hydrated oxides of aluminum and chromium, and thereafter separating the treated pigment and drying.

3. A process for producing an improved pigment which comprises adding to a suspension of a titanium pigment an aqueous suspension of coprecipitated hydrated aluminum oxide and hydrated chromic oxide, the amount of hydrated aluminum oxide added being between about 0.25% and about 2%, calculated as $Al_2O_3$ and based on the weight of the pigment, and the amount of hydrated chromic oxide added being between about 0.01% and about 0.2%, calculated as $Cr_2O_3$ and based on the weight of the pigment, adjusting the pH of the suspension to between about 5 and about 9 by adding a neutralizing agent, mixing to obtain intimate association of the titanium pigment and hydrated oxides of aluminum and chromium, and thereafter separating the treated pigment and drying.

4. A process for producing an improved pigment which comprises adding to a suspension of a titanium pigment between about 0.25% and about 2%, calculated as $Al_2O_3$ and based upon the pigment, of a soluble aluminum salt, and between about 0.01% and about 0.2%, calculated as $Cr_2O_3$ and based upon the pigment, of a soluble chromic salt, adjusting the pH of the suspension to between about 6 and about 8 by adding a neutralizing agent, mixing to obtain intimate association of the titanium pigment and hydrated oxides of aluminum and chromium, and thereafter separating the treated pigment and drying.

5. A process for producing an improved pigment which comprises adding to a suspension of a titanium pigment an aqueous suspension of co-precipitated hydrated aluminum oxide and hydrated chromic oxide, between about 0.25% and about 2% of hydrated aluminum oxide and between about 0.01% and about 0.2% hydrated chromic oxide comprising said precipitate, adjusting the pH of the suspension to between about 6 and about 8 by adding a neutralizing agent, mixing to obtain intimate association of the titanium pigment and hydrated oxides of aluminum and chromium, and thereafter separating the treated pigment and drying.

6. A process for producing an improved pigment which comprises adding to a suspension of a titanium pigment between about 0.25% and about 2%, calculated as $Al_2O_3$ and based upon the weight of the pigment, of a soluble aluminate salt, and between about 0.01% and about 0.2%, calculated as $Cr_2O_3$ and based upon the weight of the pigment, of a soluble chromic salt, adjusting the pH of the suspension to between about 6 and 8 by adding an acid substance, heating the mixture at a temperature between about 60° C. and about 90° C., subjecting the mixture to agitation during said heating in order to obtain intimate association of the titanium pigment and the hydrated oxides of aluminum and chromium, and thereafter separating the treated pigment and drying at a temperature in excess of 250° C.

7. A process for producing an improved pigment which comprises adding to a suspension of a titanium pigment between about 0.25% and about 2%, calculated as $Al_2O_3$ and based upon the weight of the pigment of a soluble aluminate salt, and between about 0.01% and about 0.2%, calculated as $Cr_2O_3$ and based upon the weight of the pigment, of a soluble chromic salt, adjusting the pH of the suspension to between about 6.8 and about 7.4 by adding a solution of alum, heating the mixture at a temperature between about 70° C. and about 85° C. for at least one hour, subjecting the mixture to agitation during said heating period and for at least one hour after the discontinuance of said heating to obtain intimate association of the titanium pigment and hydrated oxides of aluminum and chromium, thereafter separating the treated pigment and drying at a temperature in an excess of 200° C.

8. A process for producing an improved pigment which comprises adding to a suspension of a titanium pigment barium aluminate and chromic sulfate, adjusting the pH of the suspension to between about 6 and about 8 by adding a neutralizing agent, mixing to obtain intimate association of the titanium pigment and hydrated oxides of aluminum and chromium, and thereafter separating the treated pigment and drying.

9. A process for producing an improved pigment which comprises adding to a suspension of a titanium pigment between about 0.25% and about 2%, calculated as $Al_2O_3$ and based upon the weight of the pigment, of barium aluminate, and between about 0.01% and about 0.2%, calculated as $Cr_2O_3$ and based upon the weight of the pigment, of chromic sulfate, adjusting the pH of the suspension to between about 6 and about 8 by adding an acid substance, mixing to obtain intimate association of the titanium pigment and hydrated oxides of aluminum and chromium, and thereafter separating the treated pigment and drying.

10. A process for producing an improved pigment which comprises adding to a suspension of a titanium dioxide pigment between about 0.25% and about 2%, calculated as $Al_2O_3$ and based upon the weight of the pigment, of barium aluminate, and between about 0.01% and about 0.2%, calculated as $Cr_2O_3$ and based upon the weight of the pigment, of chromic sulfate, adjusting the pH of the suspension to between about 6.8 and about 7.4 by adding a solution of alum, heating the mixture at a temperature between about 60° C. and about 90° C. for at least one hour, agitating the mixture during said heating period in order to obtain intimate association of the titanium dioxide pigment with the hydrated oxides of aluminum and chromium, thereafter separating the pigment and drying at a temperature not in excess of 200° C.

11. An improved pigment which comprises an intimate mixture of a calcined titanium pigment and hydrated oxides of aluminum and chromium.

12. An improved pigment which comprises an intimate mixture of a titanium pigment, between about 0.25% and about 2%, calculated as $Al_2O_3$ and based upon the weight of the pigment, of hydrated aluminum oxide, and between about 0.01% and about 0.2%, calculated as $Cr_2O_3$ and based upon the weight of the pigment, of hydrated chromic oxide.

13. A process for producing an improved pigment which comprises preparing a suspension having a pH between about 5 and about 9, said suspension containing a titanium pigment and hydrated oxides of aluminum and chromium, the amount of hydrated aluminum oxide present being between about 0.25% and about 2%, calculated as $Al_2O_3$ and based on the weight of the pigment, and the amount of hydrated chromic oxide present being between about 0.01% and about 0.2%, calculated as $Cr_2O_3$ and based on the weight of the pigment, and thereafter separating the resulting pigment and drying.

DAVID H. DAWSON.

CERTIFICATE OF CORRECTION.

Patent No. 2,232,168. February 18, 1941.

DAVID H. DAWSON.

It is hereby certified that error appears in the printed specification of the above numbered patent requiring correction as follows: Page 3, second column, line 9, for the word "oxide" read --dioxide--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.